United States Patent
Horimoto et al.

(10) Patent No.: US 8,148,831 B2
(45) Date of Patent: *Apr. 3, 2012

(54) LATENT CATALYST FOR EPOXY RESIN, EPOXY RESIN COMPOSITION, AND SEMICONDUCTOR DEVICE

(75) Inventors: Akihiro Horimoto, Tokyo (JP); Yoshiyuki Goh, Tokyo (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 12/203,550

(22) Filed: Sep. 3, 2008

(65) Prior Publication Data

US 2009/0023840 A1 Jan. 22, 2009

Related U.S. Application Data

(63) Continuation of application No. 11/362,277, filed on Feb. 24, 2006, now abandoned, which is a continuation-in-part of application No. 10/928,618, filed on Aug. 27, 2004, now abandoned.

(30) Foreign Application Priority Data

Aug. 29, 2003 (JP) .............................. P.2003-307700
Mar. 19, 2004 (JP) .............................. P.2004-081581

(51) Int. Cl.
*H01L 23/29* (2006.01)
*C08L 63/00* (2006.01)
*B32B 27/26* (2006.01)
*B32B 27/38* (2006.01)

(52) U.S. Cl. ..................... 257/793; 428/413; 523/451

(58) Field of Classification Search .................. None
See application file for complete search history.

(56) References Cited

U.S. PATENT DOCUMENTS

| | | | |
|---|---|---|---|
| 3,360,525 A | 12/1967 | Frye | |
| 3,560,394 A | 2/1971 | Plueddemann | |
| 3,576,025 A | 4/1971 | Frye | |
| 3,679,630 A | 7/1972 | Corson | |
| 4,171,420 A | 10/1979 | Doorakian | |
| 6,306,792 B1 | 10/2001 | Miyake | |
| 6,524,989 B2 | 2/2003 | Miyake | |
| 6,881,812 B2 | 4/2005 | Miyake | |
| 6,946,421 B2 | 9/2005 | Miyake | |
| 7,671,146 B2 * | 3/2010 | Ukawa et al. ............... | 525/523 |
| 7,696,286 B2 * | 4/2010 | Endo et al. ................. | 525/481 |
| 2004/0217376 A1 | 11/2004 | Ashan | |
| 2008/0246008 A1 * | 10/2008 | Kuroda ....................... | 252/510 |
| 2009/0234080 A1 * | 9/2009 | Goh ............................ | 525/523 |

FOREIGN PATENT DOCUMENTS

| | | |
|---|---|---|
| CN | 1233626 | 11/1999 |
| JP | 10-025335 | 1/1998 |
| JP | 11-005829 A | 1/1999 |
| JP | 2001-098053 | 4/2001 |

OTHER PUBLICATIONS

Frye, C.L.; "Communication to the Editor", J. Am. Chem.Soc; Aug. 5, 1964; pp. 3170-3171, vol. 86.

Asknes, Kinetic Study of the Reaction Between Phosphonium Compounds and Hydroxyl Respectively Alkoxide Ions; Acta Chem. Scand. 16 (1962) No. 6.

* cited by examiner

Primary Examiner — Michael J Feely
(74) Attorney, Agent, or Firm — Smith, Gambrell & Russell, LLP

(57) ABSTRACT

The present invention provides a latent catalyst for epoxy resin, comprising: a cation moiety having an activity of accelerating curing reaction of epoxy resin; and a silicate anion moiety of suppressing the curing reaction-accelerating activity. Also disclosed are an epoxy resin composition comprising the latent catalyst and a semiconductor device using the epoxy resin composition.

5 Claims, No Drawings

LATENT CATALYST FOR EPOXY RESIN, EPOXY RESIN COMPOSITION, AND SEMICONDUCTOR DEVICE

REFERENCE TO RELATED APPLICATIONS

This application is a continuation of applicants' copending application Ser. No. 11/362,277, filed Feb. 24, 2006, now abandoned, which in turn is a continuation-in-part of application Ser. No. 10/928,618 filed Aug. 27, 2004 now abandoned, which are both relied on and incorporated herein by reference.

FIELD OF THE INVENTION

The present invention relates to a latent catalyst for epoxy resin, an epoxy resin composition, and a semiconductor device.

BACKGROUND OF THE INVENTION

For a method of producing semiconductor devices by encapsulating semiconductor chips, such as IC or LSI, transfer molding with an epoxy resin composition is suitable as it is inexpensive and applicable to industrial mass production of the devices, and is widely employed in the art. The properties and the reliability of semiconductor devices are being improved by improving epoxy resin and its curing agent, phenolic resin.

However, with the recent market tendency toward small-sized, lightweight and high-performance electronic appliances, the degree of integration of semiconductors for such appliances is increasing year by year, and surface mounting of semiconductor devices is promoted. Given that situation, the prerequisites for the epoxy resin composition for use in encapsulating semiconductor chips are being much severer. Accordingly, there have occurred some problems that could not be solved by conventional epoxy resin compositions.

These days the materials for encapsulating semiconductor chips are required to have high flowability that is not detracted from by the inorganic filler to be added thereto in a large amount for improving the rapid curability thereof so as to improve the production efficiency and for improving the heat resistance and the reliability of encapsulated semiconductors.

An addition reaction product of a tertiary phosphine and a quinone that has good rapid curability is added as a curing accelerator to epoxy resin compositions for use in the filed of electric and electronic materials, for the purpose of accelerating the curing reaction of the curing resins (see, e.g., Patent Document 1).

Regarding the temperature range thereof, the curing accelerator of such a type may exhibit its curing acceleration effect even at relatively low temperatures. Therefore, though slightly, the curing reaction is accelerated even in the initial stage thereof, and because of this reaction, the resin composition shall have an increased molecular weight. The increased molecular weight thereof causes an increase in the resin viscosity, and, as a result, the resin composition that contains a large amount of a filler for reliability improvement may be problematic in that its flowability is poor and therefore its moldability is also poor.

For improving the flowability of resin compositions, various trials have heretofore been made of using a curability-suppressing component so as to protect the reactive substrate in the compositions. For example, a study has been made for protecting the active site of a curing accelerator with an ion pair to give a latency, and latent catalysts having a salt structure of an organic acid and a phosphonium ion are known (see, e.g., Patent Documents 2 and 3). However, since such ordinary salts contain the suppressing component therein all the time from the initial stage to the end stage of curing reaction, they could not attain sufficient curability though could attain flowability. That is, conventional latent catalysts could not satisfy both the two necessary requirements of flowability and curability at the same time.

Patent Document 1: JP 10-025335 A (page 2)
Patent Document 2: JP 2001-098053 A (page 5)
Patent Document 3: U.S. Pat. No. 4,171,420 (pages 2-4)

SUMMARY OF THE INVENTION

An object of the invention is to provide a latent catalyst useful for epoxy resin.

Another object of the invention is to provide an epoxy resin composition of good curability, flowability and storability.

A still other object of the invention is to provide a semiconductor device having excellent solder-cracking resistance and excellent moisture-resistant reliability.

The present inventors made extensive studies so as to solve the above-mentioned problems. As a result, the inventors obtained the following findings (a) to (c) and have completed the present invention based thereon.

(a) It was found that a latent catalyst, which has a site of accelerating curing reaction of epoxy resin and a site of suppressing the curing reaction-accelerating activity, and in which the activity-suppressing site is dissociated under heat in curing reaction of epoxy resin and loses the capability of suppressing the curing reaction-accelerating activity, is extremely useful for epoxy resin.

(b) It was found that, when the latent catalyst of such a type as described above is mixed with an epoxy resin composition, then the resulting epoxy resin composition satisfies good storability, good flowability and good curability at the same time.

(c) It was found that, even when semiconductor devices manufactured by encapsulating electronic parts such as semiconductor chips with a cured product of the epoxy resin composition are exposed to high temperatures, they hardly have defects such as cracking or delamination.

Specifically, the above-described objects of the present invention have been achieved by providing the following (1) to (10):

(1) A latent catalyst for epoxy resin, comprising:
a cation moiety having an activity of accelerating curing reaction of epoxy resin; and
a silicate anion moiety of suppressing the curing reaction-accelerating activity.

(2) The latent catalyst of above (1), wherein the cation moiety contains a nitrogen cation or a phosphorus cation.

(3) The latent catalyst of above (2), represented by the following formula (1):

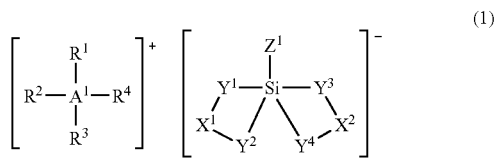

(1)

wherein $A^1$ represents a nitrogen or phosphorous atom;
$R^1$, $R^2$, $R^3$ and $R^4$ each represent an organic group having a substituted or unsubstituted, aromatic or heterocyclic ring or represent a substituted or unsubstituted aliphatic group, and $R^1$, $R^2$, $R^3$ and $R^4$ may be the same or different from one another;
$X^1$ represents an organic group that bonds to $Y^1$ and $Y^2$;
$X^2$ represents an organic group that bonds to $Y^3$ and $Y^4$;

$Y^1$ and $Y^2$ each represent a group resulting from a proton-donating substituent through release of a proton, and $Y^2$ and $Y^2$ bond to the silicon atom to form a chelate structure;

$Y^3$ and $Y^4$ each represent a group resulting from a proton-donating substituent through release of a proton, and $Y^3$ and $Y^4$ bond to the silicon atom to form a chelate structure;

$X^1$ and $X^2$ may be the same or different from each other;

$Y^1$, $Y^2$, $Y^3$ and $Y^4$ may be the same or different from one another; and $Z^1$ represents an organic group having a substituted or unsubstituted, aromatic or heterocyclic ring or represents a substituted or unsubstituted aliphatic group.

(4) The latent catalyst of above (3), wherein at least one of $R^1$, $R^2$, $R^3$ and $R^4$ in formula (1) is an organic group having a substituted or unsubstituted aromatic ring.

(5) The latent catalyst of above (4), represented by the following formula (2):

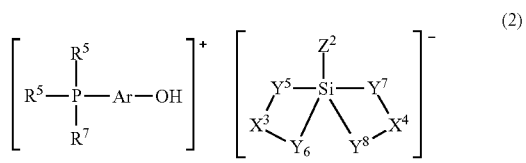

wherein $R^5$, $R^6$ and $R^7$ each represent an organic group having a substituted or unsubstituted, aromatic or heterocyclic ring or represent a substituted or unsubstituted aliphatic group, and $R^5$, $R^6$ and $R^7$ may be the same or different from one another;

Ar represents a substituted or unsubstituted aromatic group;

$X^3$ represents an organic group that bonds to $Y^5$ and $Y^6$;

$X^4$ represents an organic group that bonds to $Y^7$ and $Y^8$;

$Y^5$ and $Y^6$ each represent a group resulting from a proton-donating substituent through release of a proton, and $Y^5$ and $Y^6$ bond to the silicon atom to form a chelate structure;

$Y^7$ and $Y^8$ each represent a group resulting from a proton-donating substituent through release of a proton, and $Y^7$ and $Y^8$ bond to the silicon atom to form a chelate structure;

$X^3$ and $X^4$ may be the same or different from each other;

$Y^5$, $Y^6$, $Y^7$ and $Y^8$ may be the same or different from one another; and $Z^2$ represents an organic group having a substituted or unsubstituted, aromatic or heterocyclic ring or represents a substituted or unsubstituted aliphatic group.

(6) The latent catalyst of above (5), represented by the following formula (3):

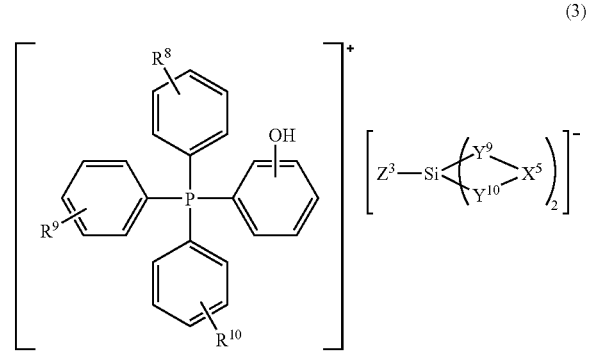

wherein $R^8$, $R^9$ and $R^{10}$ each represent one member selected from the group consisting of a hydrogen atom, a methyl group, a methoxy group and a hydroxyl group, and $R^8$, $R^9$ and $R^{10}$ may be the same or different from one another;

$X^5$ represents an organic group that bonds to $Y^9$ and $Y^{10}$;

$Y^9$ and $Y^{10}$ each represent a group resulting from a proton-donating substituent through release of a proton, and $Y^9$ and $Y^{10}$ may be the same or different from each other and $Y^9$ and $Y^{10}$ bond to the silicon atom to form a chelate structure; and $Z^3$ represents an organic group having a substituted or unsubstituted, aromatic or heterocyclic ring or represents a substituted or unsubstituted aliphatic group.

(7) An epoxy resin composition comprising:
(A) a compound having at least two epoxy groups in one molecule;
(B) a compound having at least two phenolic hydroxyl groups in one molecule; and
(C) the latent catalyst for epoxy resin of any of above (1) to (6).

(8) The epoxy resin composition of above (7), which further comprises (D) an inorganic filler.

(9) The epoxy resin composition of above (8), wherein the inorganic filler (D) is present in an amount of from 200 to 2400 parts by weight per 100 parts by weight of the sum of the compound (A) and the compound (B).

(10) A semiconductor device that comprises electronic parts encapsulated with a cured product of the epoxy resin composition of above (9).

The latent catalyst of the invention is extremely useful for epoxy resin curing acceleration, and when mixed in an epoxy resin composition, an epoxy resin composition that satisfies all of good flowability, good storability and good curability can be obtained.

The semiconductor device of the invention has good solder-cracking resistance and good moisture resistance, even when exposed to high temperatures.

DETAILED DESCRIPTION OF THE INVENTION

Preferred embodiments of the latent catalyst, the epoxy resin composition and the semiconductor device of the invention are described below.

Latent Catalyst of the Invention

The latent catalyst of the invention has a cation moiety capable of accelerating curing reaction of epoxy resin, and a silicate anion moiety having the ability to suppress the curing reaction-accelerating activity of the cation moiety. The silicate anion is not dissociated in a temperature range lower than a desired reaction temperature, and this makes it possible to suppress the curing reaction-accelerating activity of the cation moiety.

In the latent catalyst of the invention, the silicate anion structure that has an extremely low nucleophilicity does not readily initiate and accelerate curing reaction in a low-temperature range, and therefore it can imparts both properties of excellent flowability and excellent storage stability to epoxy resin at the same time. Adducts of tertiary phosphine and p-benzoquinone as in the related art, and intramolecular or intermolecular salts of onium cation and phenoxide anion such as ordinary onium-phenoxide salts readily induce curing acceleration owing to the high nucleophilicity of the phenoxide anion therein, and therefore they lower the flowability of resin compositions.

The silicate anion structure of extremely low nucleophilicity cuts its chelate bond during curing reaction, for example, under heat and dissociates itself, so that the silicate moiety is taken in a resin and loses the function of suppressing the curing reaction-accelerating activity of the cation moiety, and as a result, the released cation moiety accelerates curing reaction. Accordingly, the catalyst imparts both excellent flowability and excellent curability of resin composition at the same time. Intramolecular or intermolecular salts of onium cation and borate anion such as ordinary borate salts in the related art keep the borate anion of extremely low nucleophilicity therein all the time during curing reaction, and therefore could not attain satisfactory curability.

The structure (molecular form) of the latent catalyst of the invention may be any so far as it comprises a cation moiety capable of accelerating curing reaction of epoxy resin and an anion moiety having the ability to suppress the curing reaction-accelerating activity of the cation moiety, and examples thereof include, for example, complexes or complex salts comprising an excess anion or cation moiety coordinating therein, and other known molecular forms formed through non-covalent bonding such as molecular compounds, as well as simple salts comprising an anion moiety and a cation moiety that bond to each other through ion-bonding at a ratio of 1/1.

In the latent catalyst of the invention, the cation moiety includes, for example, a nitrogen atom, a phosphorus atom, a sulfur atom or an iodine atom. From the aspect of the reaction activity, the cation moiety preferably contains a nitrogen atom or a phosphorus atom. For the cation moiety, employable are phosphines, tertiary amines and onium salts that are used for accelerating curing reaction of epoxy resin, and preferred are onium salts.

The latent catalyst of the invention is preferably an onium silicate in which the cation moiety contains a nitrogen or phosphorus atom, and the onium silicate includes those of formula (1).

In formula (1), the atom $A^1$ is a nitrogen or phosphorous atom; and the substituents $R^1$, $R^2$, $R^3$ and $R^4$ bonding to the atom $A^1$ each are an organic group having a substituted or unsubstituted, aromatic or heterocyclic ring or are a substituted or unsubstituted aliphatic group, and they may be the same or different from one another. Examples of the substituent on the organic group having an aromatic or heterocyclic ring or on the aliphatic group include linear or branched hydrocarbon groups such as methyl, ethyl, propyl, isopropyl, butyl, isobutyl and tert-butyl, aromatic hydrocarbon groups such as phenyl and naphthyl, organic groups such as hydroxyl, nitro, sulfoxyl, thiol and amino, and halogen groups such as fluoro, chloro and bromo.

These substituents $R^1$ to $R^4$ include, for example, phenyl, methylphenyl, methoxyphenyl, hydroxyphenyl, naphthyl, hydroxynaphthyl, benzyl, methyl, ethyl, n-butyl, n-octyl and cyclohexyl groups. From the aspect of the reaction activity and the stability of the compound, preferred are substituted or unsubstituted aromatic groups such as phenyl, methylphenyl, methoxyphenyl, hydroxyphenyl and hydroxynaphthyl groups.

In formula (1), the substituent $X^1$ is an organic group that bonds to the substituents $Y^1$ and $Y^2$. Also, the substituent $X^2$ is an organic group that bonds to the substituents $Y^3$ and $Y^4$. The substituents $Y^1$ and $Y^2$ each are a group resulting from a proton-donating substituent through release of a proton, and the substituents $Y^1$ and $Y^2$ bond to the silicon atom to form a chelate structure. Also, $Y^3$ and $Y^4$ each are a group resulting from a proton-donating substituent through release of a proton, and the substituents $Y^3$ and $Y^4$ bond to the silicon atom to form a chelate structure. The substituents $X^1$ and $X^2$ may be the same or different from each other; and the substituents $Y^1$, $Y^2$, $Y^3$ and $Y^4$ may be the same or different from one another.

The groups of $Y^1X^1Y^2$ and $Y^3X^2Y^4$ in formula (1) result from divalent or more polyvalent proton donors through release of two protons. The divalent or more polyvalent proton donors include, for example, catechol, pyrogallol, 1,2-dihydroxynaphthalene, 2,3-dihydroxynaphthalene, 2,2'-biphenol, 2,2'-binaphthol, salicylic acid, 1-hydroxy-2-naphthoic acid, 3-hydroxy-2-naphthoic acid, chloranilic acid, tannic acid, 2-hydroxybenzyl alcohol, 1,2-cyclohexanediol, 1,2-propanediol and glycerin. Of those, preferred are catechol, 1,2-dihydroxynaphthalene and 2,3-dihydroxynaphthalene from the aspect of the storage stability and the moisture-resistant reliability.

In formula (1), $Z^1$ is an organic group having a substituted or unsubstituted, aromatic or heterocyclic ring or is a substituted or unsubstituted aliphatic group. Specific examples thereof include aliphatic hydrocarbon groups such as methyl, ethyl, propyl, butyl, hexyl and octyl groups; aromatic hydrocarbon groups such as phenyl, benzyl, naphthyl, anthracenyl and biphenyl groups; and reactive substituents such as glycidyloxypropyl, mercaptopropyl, aminopropyl and vinyl groups. Of those, preferred are methyl, phenyl, naphthyl and biphenyl groups from the aspect of the heat stability. Examples of the substituent on the organic group having an aromatic or heterocyclic ring or on the aliphatic group include linear or branched hydrocarbon groups such as methyl, ethyl, propyl, isopropyl, butyl, isobutyl and tert-butyl, aromatic hydrocarbon groups such as phenyl and naphthyl, organic groups such as hydroxyl, nitro, sulfoxyl, thiol, amino and glycidyl ether, and halogen groups such as fluoro, chloro and bromo.

These onium silicates as the latent catalyst according to the invention are extremely superior to conventional curing accelerators in the point of its properties as curing accelerators, especially the curability, the flowability and the storability thereof.

Of the onium silicates, more preferred latent catalysts include those of formula (2) shown above having a phosphonium cation.

In formula (2), the substituents $R^5$, $R^6$ and $R^7$ bonding to the phosphorus atom each are an organic group having a substituted or unsubstituted, aromatic or heterocyclic ring or are a substituted or unsubstituted aliphatic group, and they may be the same or different from one another. Examples of the substituent on the organic group having an aromatic or heterocyclic ring or on the aliphatic group include linear or branched hydrocarbon groups such as methyl, ethyl, propyl, isopropyl, butyl, isobutyl and tert-butyl, aromatic hydrocarbon groups such as phenyl and naphthyl, organic groups such as hydroxyl, nitro, sulfoxyl, thiol and amino, and halogen groups such as fluoro, chloro and bromo.

These substituents $R^5$ to $R^7$ include, for example, phenyl, methylphenyl, methoxyphenyl, hydroxyphenyl, naphthyl, hydroxynaphthyl, benzyl, methyl, ethyl, n-butyl, n-octyl and cyclohexyl groups. Specifically, as for the substituents $R^5$, $R^6$ and $R^7$ in formula (2), it is preferable that each of substituents $R^5$, $R^6$ and $R^7$ is a substituted or unsubstituted aromatic group, such as phenyl, methylphenyl, methoxyphenyl, hydroxyphenyl and hydroxynaphthyl groups. Latent catalysts with such preferred substituents have especially excellent reactivity of curing and stability of chemical structure.

In formula (2), the substituent Ar is a substituted or unsubstituted aromatic group. The substituent Ar includes, for example, phenyl, methylphenyl, methoxyphenyl, hydroxyphenyl, naphthyl and hydroxynaphthyl groups. Specifically, preferred examples of the substituent Ar include phenyl, methylphenyl, methoxyphenyl, hydroxyphenyl and hydroxynaphthyl groups. Latent catalysts with such preferred substituents have especially excellent reactivity of curing and stability of chemical structure. Examples of the substituent on the organic group having an aromatic or heterocyclic ring or on the aliphatic group include linear or branched hydrocarbon groups such as methyl, ethyl, propyl, isopropyl, butyl, isobutyl and tert-butyl, aromatic hydrocarbon groups such as phenyl and naphthyl, organic groups such as hydroxyl, nitro, sulfoxyl, thiol and amino, and halogen groups such as fluoro, chloro and bromo.

In formula (2), the substituent $X^3$ is an organic group that bonds to the substituents $Y^5$ and $Y^6$. Also, the substituent $X^4$ is an organic group that bonds to the substituents $Y^7$ and $Y^8$. The substituents $Y^5$ and $Y^6$ each are a group resulting from a proton-donating substituent through release of a proton, and the substituents $Y^5$ and $Y^6$ bond to the silicon atom to form a chelate structure. Also, the substituents $Y^7$ and $Y^8$ each are a group resulting from a proton-donating substituent through release of a proton, and the substituents $Y^7$ and $Y^8$ bond to the silicon atom to form a chelate structure. The substituents $X^3$ and $X^4$ may be the same or different from each other; and $Y^5$, $Y^6$, $Y^7$ and $Y^8$ may be the same or different from one another.

The groups of $Y^5X^3Y^6$ and $Y^7X^4Y^8$ in formula (2) result from divalent or more polyvalent proton donors through release of two protons. The divalent or more polyvalent proton donors include, for example, catechol, pyrogallol, 1,2-dihydroxynaphthalene, 2,3-dihydroxynaphthalene, 2,2'-biphenol, 2,2'-binaphthol, salicylic acid, 1-hydroxy-2-naphthoic acid, 3-hydroxy-2-naphthoic acid, chloranilic acid, tannic acid, 2-hydroxybenzyl alcohol, 1,2-cyclohexanediol, 1,2-propanediol and glycerin. Of those, preferred are catechol, 1,2-dihydroxynaphthalene and 2,3-dihydroxynaphthalene from the aspect of the storage stability and the moisture-resistant reliability.

In formula (2), $Z^2$ is an organic group having a substituted or unsubstituted, aromatic or heterocyclic ring or is a substituted or unsubstituted aliphatic group. Specific examples thereof include aliphatic hydrocarbon groups such as methyl, ethyl, propyl, butyl, hexyl and octyl groups; aromatic hydrocarbon groups such as phenyl, benzyl, naphthyl, anthracenyl and biphenyl groups; and reactive substituents such as glycidyloxypropyl, mercaptopropyl, aminopropyl and vinyl groups. Of those, preferred are methyl, phenyl, naphthyl and biphenyl groups from the aspect of the heat stability. Examples of the substituent on the organic group having an aromatic or heterocyclic ring or on the aliphatic group include linear or branched hydrocarbon groups such as methyl, ethyl, propyl, isopropyl, butyl, isobutyl and tert-butyl, aromatic hydrocarbon groups such as phenyl and naphthyl, organic groups such as hydroxyl, nitro, sulfoxyl, thiol, amino and glycidyl ether, and halogen groups such as fluoro, chloro and bromo.

Of the onium silicates, more preferred latent catalysts include those of formula (3) shown above having a phosphonium cation in which the organic groups bonding to the phosphorus atom each are a substituted or unsubstituted phenyl group.

In formula (3), the substituents $R^8$, $R^9$ and $R^{10}$ on the phenyl groups are selected from a hydrogen atom, a methyl group, a methoxy group and a hydroxyl group, and they may be the same or different from each other.

In formula (3), the substituent $X^5$ is an organic group that bonds to the substituents $Y^9$ and $Y^{10}$. The substituents $Y^9$ and $Y^{10}$ each are a group resulting from a proton-donating substituent through release of a proton, and they may be the same or different from each other, and the substituents $Y^9$ and $Y^{10}$ bond to the silicon atom to form a chelate structure.

The group of $Y^9X^5Y^{10}$ in formula (3) results from divalent or more polyvalent proton donors through release of two protons. The divalent or more polyvalent proton donors include, for example, catechol, pyrogallol, 1,2-dihydroxynaphthalene, 2,3-dihydroxynaphthalene, 2,2'-biphenol, 2,2'-binaphthol, salicylic acid, 1-hydroxy-2-naphthoic acid, 3-hydroxy-2-naphthoic acid, chloranilic acid, tannic acid, 2-hydroxybenzyl alcohol, 1,2-cyclohexanediol, 1,2-propanediol and glycerin. Of those, preferred are catechol, 1,2-dihydroxynaphthalene and 2,3-dihydroxynaphthalene from the aspect of the storage stability and the moisture-resistant reliability.

In formula (3), $Z^3$ is an organic group having a substituted or unsubstituted, aromatic or heterocyclic ring or is a substituted or unsubstituted aliphatic group. Specific examples thereof include aliphatic hydrocarbon groups such as methyl, ethyl, propyl, butyl, hexyl and octyl groups; aromatic hydrocarbon groups such as phenyl, benzyl, naphthyl, anthraceyl and biphenyl groups; and reactive substituents such as glycidyloxypropyl, mercaptopropyl, aminopropyl and vinyl groups. Of those, preferred are methyl, phenyl, naphthyl and biphenyl groups from the aspect of the heat stability. Examples of the substituent on the organic group having an aromatic or heterocyclic ring or on the aliphatic group include linear or branched hydrocarbon groups such as methyl, ethyl, propyl, isopropyl, butyl, isobutyl and tert-butyl, aromatic hydrocarbon groups such as phenyl and naphthyl, organic groups such as hydroxyl, nitro, sulfoxyl, thiol, amino and glycidyl ether, and halogen groups such as fluoro, chloro and bromo.

The phosphonium silicates of formula (3) are preferred as their synthesis can be made simple since the two proton-donating substituents constituting the chelate are the same.

A method for synthesizing the latent catalyst of formula (1) of the invention is described below.

As a synthesizing method of the latent catalyst of the invention, it is preferable that contacting an onium salt compound such as an onium halide with an alkali metal salt of a silicate. The alkali metal salt of a silicate is obtained by neutralizing, with an alkali hydroxide such as sodium hydroxide, a trialkoxysilane (trialkoxysilane compound) and a proton donor that can make a chelate bonding with a silicon atom. The synthesis scheme is represented by the reaction formula shown below. According to the synthesis method, the intended latent catalyst can be easily synthesized at a high yield.

The trialkoxysilane (trialkoxysilane compound) includes, for example, phenyltrimethoxysilane, phenyltriethoxysilane, methyltrimethoxysilane, methyltriethoxysilane, ethyltrimethoxysilane, ethyltriethoxysilane, hexyltrimethoxysilane and hexyltriethoxysilane.

Examples of the onium salt compound include onium halide compounds and onium hydroxide compounds. The onium halide compounds include onium halide compounds having an organic group having an optionally-substituted, aromatic or heterocyclic ring and those having an optionally-substituted aliphatic group, while the onium hydroxide compounds include onium hydroxide compounds having an organic group having an optionally-substituted, aromatic or heterocyclic ring and those having an optionally-substituted aliphatic group. Specific examples thereof include sulfonium halide compounds such as triphenylsulfonium bromide, ammonium halide compounds such as methyltrioctylammonium bromide and tetraphenylammonium bromide, and phosphonium halide compounds such as tetrabutylphosphonium bromide, tetraphenylphosphonium bromide, triphenyl (2-hydroxyphenyl)phosphonium bromide, triphenyl (3-hydroxyphenyl) phosphonium bromide, triphenyl (6-hydroxy-2-naphthalene)phosphonium bromide, tris(4-methylphenyl)(2-hydroxyphenyl)phosphonium bromide and tris(4-methoxyphenyl)(2-hydroxyphenyl)phosphonium bromide each of which may be optionally substituted, and onium hydroxide compounds such as tetraphenylphosphonium hydroxide and tetrabutylphosphonium hydroxide, each of which may be optionally substituted. Of these, the onium halide compounds are preferred because raw materials for them are easily available at a low cost and they have excellent chemical stability.

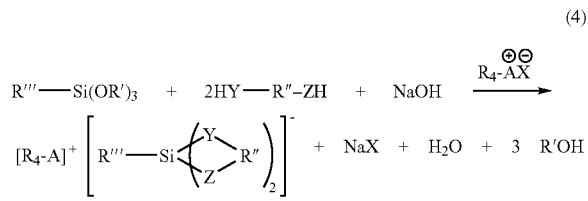

(4)

wherein A represents a phosphorus or nitrogen atom; R represents an organic group having a substituted or unsubstituted, aromatic or heterocyclic ring or represents a substituted or unsubstituted aliphatic group; X represents a monovalent anion; R' represents an aliphatic group; and Y and Z each represent a group resulting from a proton-donating substituent through release of one proton; R" represents an organic group that bonds to the proton-donating substituents YH and ZH; R''' represents an organic group having a substituted or unsubstituted, aromatic or heterocyclic ring or represents a substituted or unsubstituted aliphatic group.

In the above-mentioned reaction, the onium silicate can be easily obtained by adding dropwise a solution of the onium salt compound such as an onium halide compound to a solution of the silicate complex that is formed by neutralizing a solution of the trialkoxysilane (trialkoxysilane compound) and the proton donor with an alkali such as sodium hydroxide, at room temperature.

The solvent for use in the reaction is, for example, preferably an alcohol solvent such as methanol, ethanol or propanol. For increasing the yield, the solvent may be optionally mixed with a re-precipitation solvent such as water.

Another synthesizing method is to react the proton donor, the trialkoxysilane compound and the onium salt compound in an organic solvent in the presence of a metal alkoxide compound. More specifically, the onium silicate can be prepared by a synthetic route of mixing the proton donor that can make a chelate bonding with a silicon atom and the trialkoxysilane compound in an organic solvent such as alcohol which can dissolve therein these compounds; adding a metal alkoxide compound in the solid form or adding dropwise a solution obtained in advance by dissolving it in an organic solvent to the resulting mixture; and then adding the onium salt compound in the solid form or adding dropwise a solution obtained in advance by dissolving it in an organic solvent. The above-described preparation process enables synthesis at a high yield.

In the present invention, the onium silicate can also be synthesized by mixing the proton donor, the trialkoxysilane compound and the onium salt compound in an organic solvent in the presence of a metal alkoxide compound.

Examples of the alkoxide compound usable here include alcoholate compounds of an alkali metal such as sodium methoxide, sodium ethoxide, sodium-t-butoxide and potassium butoxide. Of these, sodium methoxide is preferred from the aspect of its cost.

The above-described reaction proceeds even in a solventless manner, but it is preferably carried out in an organic solvent from the aspects of the uniform reaction and yield. The reaction in an alcohol solvent such as methanol, ethanol or propanol is more preferred.

In the above-described reaction, the proton donor ($M_1$) and the trialkoxysilane compound ($M_2$) are charged preferably at a ($M_1$)/($M_2$) molar ratio of from 0.5 to 5, with a range of from 1.5 to 2.5 being more preferred from the standpoints of yield and purity. The proton donor ($M_1$) and the metal alkoxide compound ($M_3$) are charged preferably at a ($M_1$)/($M_3$) molar ratio of from 0.5 to 5, with a range of from 1.5 to 2.5 being more preferred from the standpoints of yield and purity. The proton donor ($M_1$) and the onium salt compound ($M_4$) are charged preferably at a ($M_1$)/($M_4$) molar ratio of from 0.5 to 5, with a range of from 1.5 to 2.5 being more preferred from the standpoints of yield and purity.

The above-described reaction proceeds sufficiently at room temperature, but can also be effected under heating in order to obtain a desired latent catalyst efficiently in a short time.

The product of the above-described reaction can have improved purity by washing and purifying with an alcohol solvent such as methanol or ethanol, an ether solvent such as diethyl ether or tetrahydrofuran, or an aliphatic hydrocarbon solvent such as n-hexane.

The above-mentioned synthetic route is one general method for synthesizing the latent catalyst of formula (1), but the invention is not limited thereto.

Epoxy Resin Composition of the Invention

The epoxy resin composition of the invention comprises (A) a compound having at least two epoxy groups in one molecule, (B) a compound having at least two phenolic hydroxyl groups in one molecule, (C) the latent catalyst of the invention, and (c) an inorganic filler, and optionally (D) an inorganic filler. The epoxy resin composition has excellent curability, flowability and storability.

The components of the epoxy resin composition of the invention are described below.

Compound (A) Having at Least Two Epoxy Groups in One Molecule

The compound (A) having at least two epoxy groups in one molecule for use in the invention may be any so far as it has at least two epoxy groups in one molecule, and there is no particular limitation posed thereon.

The compound (A) includes, for example, bisphenol-type epoxy resins such as bisphenol A-type epoxy resins, bisphenol F-type epoxy resins and bromobisphenol-type epoxy resins; biphenyl-type epoxy resins, biphenylaralkyl-type epoxy resins, stilbene-type epoxy resins, phenol-novolak-type epoxy resins, cresol-novolak-type epoxy resins, naphthalene-type epoxy resins, dicyclopentadiene-type epoxy resins, dihydroxybenzene-type epoxy resins; epoxy compounds that are produced by reacting epichlorohydrin on the hydroxyl group of phenols, phenolic resins or naphthols; epoxy resins produced through oxidative epoxydation of olefins with peracids; glycidyl ester-type epoxy resins and glycidylamine-type epoxy resins. These compounds may be used either singly or in combination of two or more thereof.

Compound (B) Having at Least Two Phenol Hydroxyl Groups in One Molecule

The compound (B) for use in the invention has at least two phenol hydroxyl groups in one molecule, and it acts or functions as a curing agent for the compound (A).

The compound (B) includes phenol-novolak resins, cresol-novolak resins, bisphenol resins, phenolaralkyl resins, biphenylaralkyl resins, trisphenol resins, xylene-modified novolak resins, terpene-modified novolak resins and dicyclopentadiene-modified phenol resins. These compounds may be used either singly or in combination of two or more thereof.

Latent Catalyst (C)

The latent catalyst (C) for use in the epoxy resin composition of the invention is the above-mentioned latent catalyst. In particular, onium silicates are preferred, including, for example, sulfonium silicate, ammonium silicate, pyridinium silicate, phosphonium silicate, iodonium silicate, and selenium silicate. These compounds may be used either singly or in combination of two or more thereof.

Inorganic Filler (D)

The inorganic filler (D) may be blended with the epoxy resin composition for the purpose of improving the solder resistance of the resulting semiconductor devices. There is no particular limitation posed on the kind thereof, and any of those generally used in encapsulating materials may be used.

The inorganic filler (D) includes, for example, fused and crushed silica, fused silica, crystalline silica, secondary aggregated silica, alumina, titanium white, aluminium hydroxide, talc, clay and glass fibers. They may be used either singly or in combination of two or more thereof.

Though not particularly limited, the content (blending amount) of the latent catalyst (C) in the epoxy resin composition of the invention is preferably about 0.01 to 10% by weight, more preferably about 0.1 to 5% by weight. Within the range, the epoxy resin composition has well-balanced properties among curability, flowability, storability, and properties of its cured products.

Also though not particularly limited, the blending ratio of the compound (A) having at least two epoxy groups in one molecule to the compound (B) having at least two phenolic hydroxyl groups in one molecule is preferably such that the phenolic hydroxyl group of the compound (B) is about 0.5 to 2 mol, more preferably about 0.7 to 1.5 mol per 1 mol of the epoxy group of the compound (A). Within the range, the epoxy resin composition keep a suitable balance among various properties, and the various properties are further improved.

Also though not particularly limited, the content (blending amount) of the inorganic filler (D) is preferably about 200 to 2400 parts by weight, more preferably about 400 to 1400 parts per 100 parts by weight of the sum of the compound (A) and the compound (B). If the content thereof is less than the lower limit of the range, then the inorganic filler (D) may have insufficient reinforcing effect; on the other hand, if the content of the inorganic filler (D) is more than the upper limit of the range, then the flowability of the epoxy resin composition may lower and may therefore cause filling insufficiency upon molding the epoxy resin composition (for example, upon manufacturing semiconductor devices).

When the content (blending amount) of the inorganic filler (D) falls between 400 and 1400 parts by weight per 100 parts by weight of the sum of the compound (A) and the compound (B), then the moisture absorption of the cured products of the epoxy resin composition becomes lower and the occurrence of solder cracks can be prevented. The epoxy resin composition of this type has good flowability upon heat-melting, and therefore the occurrence of wire deformation inside semiconductor devices can be effectively prevented.

The content (blending amount) of the inorganic filler (D) in terms of parts by weight may be dealt with by converting it to % by volume taking into account the specific gravity of the compound (A), the compound (B) and the inorganic filler (D) itself.

Apart from the compounds (components) (A) to (D) mentioned above, the epoxy resin composition of the invention may optionally contain various additives of, for example, coupling agent such as γ-glycidoxypropyltrimethoxysilane, colorant such as carbon black, flame retardant such as bromoepoxy resin, antimony oxide or phosphorus compound, a low-stress component such as silicone oil or silicone rubber, lubricant such as natural wax, synthetic wax, higher fatty acid or its metal salt or paraffin, and antioxidant.

To the extent that the properties of the latent catalyst (C) that functions as a curing accelerator in the invention are not impaired, the epoxy resin composition may contain any other known catalyst such as triphenyl phosphine, 1,8-diazabicyclo (5.4.0)-7-undecene or 2-methylimidazole.

The epoxy resin composition of the invention may be obtained by mixing the compounds (A) to (C) and optionally the compound (D) along with any other additives by the use of a mixer at room temperature, then heating and kneading the mixture with a hot roll, a heating kneader or the like, and cooling and grinding the resulting mixture.

The thus obtained epoxy resin composition for use as a molding resin is molded and cured by a molding method such as transfer molding, compression molding, injection molding or the like to encapsulate electronic parts such as semiconductor elements. In this way, a semiconductor device of the present invention can be obtained.

The type of the semiconductor device of the invention is not particularly limited. For example, it includes SIP (single inline package), HSIP (SIP with heat sink), ZIP (zigzag inline package), DIP (dual inline package), SDIP (shrink dual inline package), SOP (small outline package), SSOP (shrink small outline package), TSOP (thin small outline package), SOJ (small outline J-leaded package), QFP (quad flat package), QFP (FP) (QFP fine pitch), TQFP (thin quad flat package), QFJ (PLCC) (quad flat J-leaded package), BGA (ball grid array), etc.

The thus obtained semiconductor device of the invention has excellent solder-cracking resistance and excellent moisture-resistant reliability.

The latent catalyst (C) of the invention, especially the compound of formula (I) is thermally stable and the silicate anion moiety therein is bulky. Accordingly, the ion mobility of the free ion derived from the latent catalyst through dissociation during curing reaction is low. This makes the solder-cracking resistance and the moisture-resistant reliability of the semiconductor device of the invention excellent.

In the foregoing embodiment, the epoxy resin composition of the invention is used as an encapsulating material for semiconductor devices. However, the application of the epoxy resin composition of the invention is not limited thereto. Depending on the use of the epoxy resin composition of the invention, the addition of the inorganic filler may be omitted.

Although preferred embodiments of the latent catalyst, the epoxy resin composition and the semiconductor device of the invention have been illustrated above, the invention is not limited to those embodiments.

EXAMPLES

The present invention will be illustrated in greater detail with reference to the following Examples and Comparative Examples, but the invention should not be construed as being limited thereto.

Compounds C1 to C13 and triphenyl phosphine for use as a latent catalyst were prepared.

Production of Compound C1

7.92 g (0.040 mol) of phenyltrimethoxysilane, 8.81 g (0.080 mol) of catechol, a sodium hydroxide solution prepared by dissolving 1.60 g (0.04 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 13.7 g (0.040 mol) of triphenylsulfonium bromide in 50 ml of methanol was gradually and dropwise added to the flask, and then a crystal was precipitated. The crystal was taken out through filtration, washed with water and dried in vacuum, thereby obtaining 19.2 g of a pale whitish brown crystal.

This compound was taken as compound C1. The compound C1 was analyzed through 1H-NMR, mass spectrometry and elementary analysis, which confirmed that the compound C1 was the intended sulfonium silicate of the following formula (5). The yield of the compound C1 was 82%.

(5)

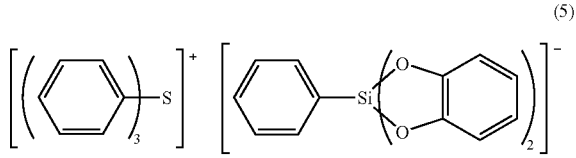

Production of Compound C2

5.45 g (0.040 mol) of methyltrimethoxysilane, 12.82 g (0.080 mol) of 2,3-dihydroxynaphthalane, a sodium hydroxide solution prepared by dissolving 1.60 g (0.040 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 17.3 g (0.040 mol) of methyltrioctylammonium bromide in 50 ml of methanol was gradually and dropwise added to the flask, and then a crystal was precipitated. The crystal was taken out through filtration, washed with water and dried in vacuum, thereby obtaining 21.0 g of a pale whitish yellow crystal.

This compound was taken as compound C2. The compound C2 was analyzed through 1H-NMR, mass spectrometry and elementary analysis, which confirmed that the compound C2 was the intended ammonium silicate of the following formula (6). The yield of the compound C2 was 72%.

(6)

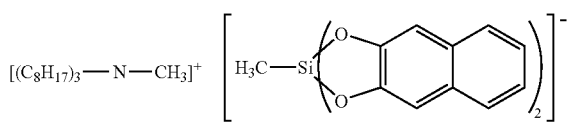

Production of Compound C3

7.92 g (0.040 mol) of phenyltrimethoxysilane, 8.81 g (0.080 mol) of catechol, a sodium hydroxide solution prepared by dissolving 1.60 g (0.040 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 8.65 g (0.040 mol) of trimethylphenylammonium bromide in 25 ml of methanol was gradually and dropwise added to the flask, and then a crystal was precipitated. The crystal was taken out through filtration, washed with water and dried in vacuum, thereby obtaining 13.7 g of a white crystal.

This compound was taken as compound C3. The compound C3 was analyzed through 1H-NMR, mass spectrometry and elementary analysis, which confirmed that the compound C3 is the intended ammonium silicate of the following formula (7). The yield of the compound C3 was 75%.

(7)

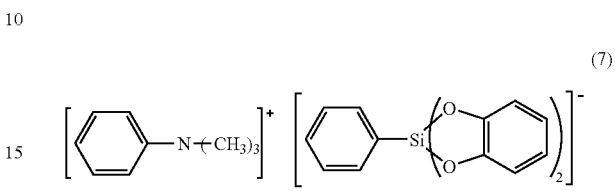

Production of Compound C4

8.26 g (0.040 mol) of hexyltrimethoxysilane, 12.82 g (0.080 mol) of 2,3-dihydroxynaphthalane, a sodium hydroxide solution prepared by dissolving 1.60 g (0.040 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 13.6 g (0.040 mol) of tetrabutylphosphonium bromide in 25 ml of methanol was gradually and dropwise added to the flask, and then a crystal was precipitated. The crystal was taken out through filtration, washed with water and dried in vacuum, and it gave 21.5 g of a pale whitish red crystal.

This compound was taken as compound C4. The compound C4 was analyzed through 1H-NMR, mass spectrometry and elementary analysis, which confirmed that the compound C4 is the intended phosphonium silicate of the following formula (8). The yield of the compound C4 was 78%.

(8)

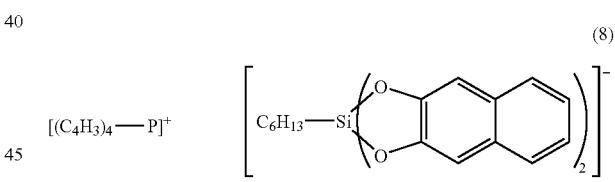

Production of Compound C5

5.45 g (0.040 mol) of methyltrimethoxysilane, 12.82 g (0.080 mol) of 2,3-dihydroxynaphthalane, a sodium hydroxide solution prepared by dissolving 1.60 g (0.040 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 16.8 g (0.040 mol) of tetraphenylphosphonium bromide in 25 ml of methanol was gradually and dropwise added to the flask, and then a crystal was precipitated. The crystal was taken out through filtration, washed with water and dried in vacuum, thereby obtaining 21.8 g of a pale whitish red crystal.

This compound was taken as compound C5. The compound C5 was analyzed through 1H-NMR, mass spectrometry and elementary analysis, which confirmed that the compound C5 is the intended phosphonium silicate of the following formula (9). The yield of the compound C5 was 78%.

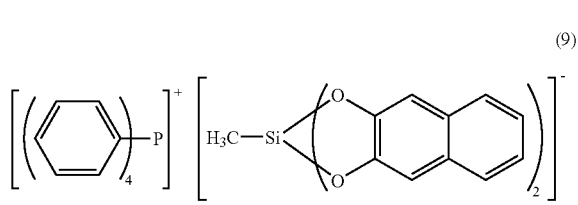

(9)

Production of Compound C6

10.4 g (0.060 mol) of 2-bromophenol, 17.3 g (0.066 mol) of triphenyl phosphine, 0.65 g (5 mmol) of nickel chloride, and 40 ml of ethylene glycol were put into a separable flask (volume, 200 ml) equipped with a condenser and a stirrer, and reacted with stirring under heat at 160° C. The reaction liquid was cooled, 40 ml of pure water was dropwise added thereto, and the deposited crystal was washed with toluene, taken out through filtration, and dried to obtain triphenyl(2-hydroxyphenyl)phosphonium bromide.

Next, 7.92 g (0.040 mol) of phenyltrimethoxysilane, 6.40 g (0.040 mol) of 2,3-dihydroxynaphthalane, a sodium hydroxide solution prepared by dissolving 1.60 g (0.04 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 17.4 g (0.040 mol) of triphenyl(3-hydroxyphenyl)phosphonium bromide that had been prepared previously, in 25 ml of methanol was gradually and dropwise added to the flask, and then a crystal was precipitated. The crystal was taken out through filtration, washed with water and dried in vacuum, thereby obtaining 20.3 g of a pale reddish white crystal.

This compound was taken as compound C7. The compound C7 was analyzed through 1H-NMR, mass spectrometry and elementary analysis, which confirmed that the compound C7 is the intended phosphonium silicate of the following formula (11). The yield of the compound C7 was 75%.

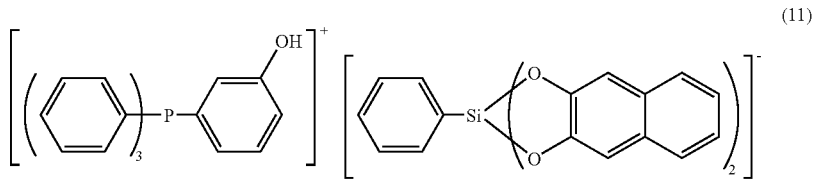

(11)

Next, 3.96 g (0.020 mol) of phenyltrimethoxysilane, 6.40 g (0.040 mol) of 2,3-dihydroxynaphthalane, a sodium hydroxide solution prepared by dissolving 0.80 g (0.02 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 17.4 g (0.040 mol) of triphenyl(2-hydroxyphenyl)phosphonium bromide that had been prepared previously, in 25 ml of methanol was gradually and dropwise added to the flask, and then a crystal was precipitated. The crystal was taken out through filtration, washed with water and dried in vacuum, thereby obtaining 16.7 g of a pale yellowish white crystal.

This compound was taken as compound C6. The compound C6 was analyzed through 1H-NMR, mass spectrometry and elementary analysis, which confirmed that the compound C6 is the intended phosphonium silicate molecular compound of the following formula (10). The yield of the compound C6 was 81%.

Production of Compound C8

13.4 g (0.060 mol) of 6-bromo-2-naphthol, 17.3 g (0.066 mol) of triphenyl phosphine, 0.65 g (5 mmol) of nickel chloride, and 40 ml of ethylene glycol were put into a separable flask (volume, 200 ml) equipped with a condenser and a stirrer, and reacted with stirring under heat at 160° C. The reaction liquid was cooled, 40 ml of pure water was dropwise added thereto, and the deposited crystal was washed with toluene, taken out through filtration, and dried to obtain triphenyl(6-hydroxy-2-naphthalene)phosphonium bromide.

Next, 5.45 g (0.040 mol) of methyltrimethoxysilane, 2.8 g (0.080 mol) of 2,3-dihydroxynaphthalane, a sodium hydroxide solution prepared by dissolving 1.60 g (0.040 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 19.4 g (0.040 mol) of triphenyl(6-hydroxy-2-naphthalene)phosphonium bromide that had been prepared previously, in 25 ml of

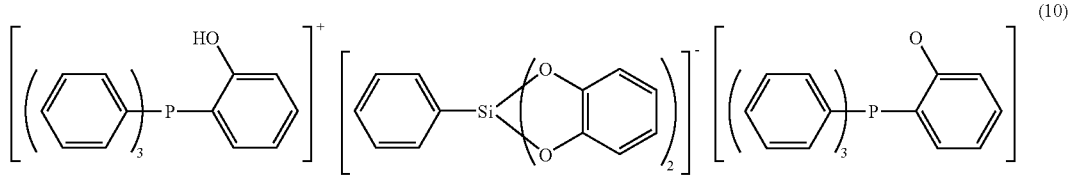

(10)

Production of Compound C7

10.4 g (0.060 mol) of 3-bromophenol, 17.3 g (0.066 mol) of triphenyl phosphine, 0.65 g (5 mmol) of nickel chloride, and 40 ml of ethylene glycol were put into a separable flask (volume, 200 ml) equipped with a condenser and a stirrer, and reacted with stirring under heat at 160° C. The reaction liquid was cooled, 40 ml of pure water was dropwise added thereto, and the deposited crystal was washed with toluene, taken out through filtration, and dried to obtain triphenyl(3-hydroxyphenyl)phosphonium bromide.

methanol was gradually and dropwise added to the flask, and then a crystal was precipitated. The crystal was taken out through filtration, washed with water and dried in vacuum, thereby obtaining 20.8 g of a pale reddish white crystal.

This compound was taken as compound C8. The compound C8 was analyzed through 1H-NMR, mass spectrometry and elementary analysis, which confirmed that the compound C8 is the intended phosphonium silicate of the following formula (12). The yield of the compound CB was 73%.

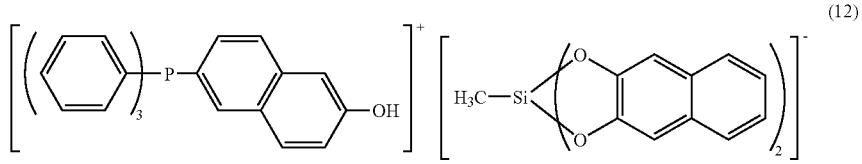

(12)

Production of Compound C9

10.4 g (0.060 mol) of 2-bromophenol, 20.1 g (0.066 mol) of tris(4-methylphenyl) phosphine, 0.65 g (5 mmol) of nickel chloride, and 40 ml of ethylene glycol were put into a separable flask (volume, 200 ml) equipped with a condenser and a stirrer, and reacted with stirring under heat at 160° C. The reaction liquid was cooled, 40 ml of pure water was dropwise added thereto, and the deposited crystal was washed with toluene, taken out through filtration, and dried to obtain tris (4-methylphenyl)(3-hydroxyphenyl) bromide.

Next, 6.01 g (0.040 mol) of ethyltriethoxysilane, 8.81 g (0.080 mol) of catechol, a sodium hydroxide solution prepared by dissolving 1.60 g (0.04 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 19.1 g (0.040 mol) of tris(4-methylphenyl) (3-hydroxyphenyl)phosphonium bromide that had been prepared previously, in 25 ml of methanol was gradually and dropwise added to the flask, and then a crystal was precipitated. The crystal was taken out through filtration, washed with water and dried in vacuum, thereby obtaining 20.1 g of a pale reddish white crystal.

This compound was taken as compound C9. The compound C9 was analyzed through 1H-NMR, mass spectrometry and elementary analysis, which confirmed that the compound C9 is the intended phosphonium silicate of the following formula (13). The yield of the compound C9 was 76%.

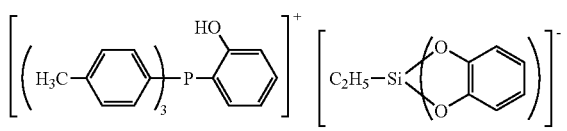

(13)

Production of Compound C10

10.4 g (0.060 mol) of 2-bromophenol, 23.20 g (0.066 mol) of tris(4-methoxyphenyl) phosphine, 0.65 g (5 mmol) of nickel chloride, and 40 ml of ethylene glycol were put into a separable flask (volume, 200 ml) equipped with a condenser and a stirrer, and reacted with stirring under heat at 160° C. The reaction liquid was cooled, 40 ml of pure water was dropwise added thereto, and the deposited crystal was washed with toluene, taken out through filtration, and dried to obtain tris(4-methoxyphenyl)(2-hydroxyphenyl)phosphonium bromide.

Next, 7.93 g (0.040 mol) of phenyltrimethoxysilane, 15.1 g (0.080 mol) of 3-hydroxy-2-naphthoic acid, a sodium hydroxide solution prepared by dissolving 1.60 g (0.04 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 19.1 g (0.040 mol) of tris(4-methoxyphenyl)(2-hydroxyphenyl)phosphonium bromide that had been prepared previously, in 25 ml of methanol was gradually and dropwise added to the flask, and then a crystal was precipitated. The crystal was taken out through filtration, washed with water and dried in vacuum, thereby obtaining 24.1 g of a pale yellowish white crystal.

This compound was taken as compound C10. The compound C10 was analyzed through 1H-NMR, mass spectrometry and elementary analysis, which confirmed that the compound C10 is the intended phosphonium silicate of the following formula (14). The yield of the compound C10 was 70%.

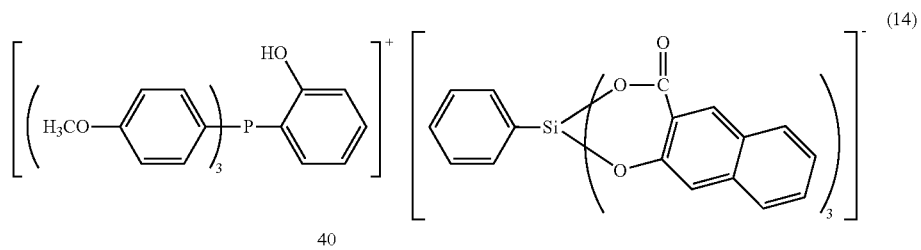

(14)

Production of Compound C11

6.49 g (0.060 mol) of benzoquinone, 17.3 g (0.066 mol) of triphenyl phosphine, and 40 ml of acetone were put into a separable flask (volume, 200 ml) equipped with a condenser and a stirrer, and reacted with stirring at room temperature. The deposited crystal was washed with acetone, taken out through filtration, and dried to obtain triphenyl(2,5-dihydroxyphenyl)phosphobetaine.

Next, 7.92 g (0.040 mol) of phenyltrimethoxysilane, 12.8 g (0.080 mol) of 2,3-dihydroxynaphthalene, a sodium hydroxide solution prepared by dissolving 1.60 g (0.04 mol) of sodium hydroxide in 10 ml of methanol, and 50 ml of methanol were put into a separable flask (volume, 200 ml) equipped with a condenser and a stirrer, and stirred and uniformly dissolved therein. A solution prepared by dissolving 14.8 g (0.040-mol) of triphenyl(2,5-dihydroxyphenyl)phosphobetaine that had been prepared previously, in 200 ml of methanol was gradually and dropwise added to the flask, and then a crystal was precipitated. The crystal was taken out through filtration, washed with water and dried in vacuum, thereby obtaining 20.0 g of a pale brownish white crystal.

This compound was taken as compound C11. The compound C11 was analyzed through 1H-NMR, mass spectrometry and elementary analysis, which confirmed that the compound C11 is the intended phosphonium silicate of the following formula (15). The yield of the compound C11 was 63%.

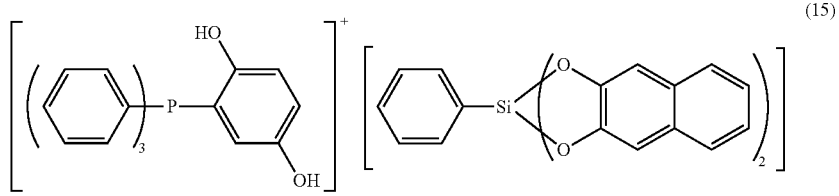
(15)

Production of Compound C12

32.0 g (0.20 mol) of 2,3-dihydroxynaphthalene, 19.8 g (0.10 mol) of phenyltrimethoxysilane and 150 ml of ethanol were put into a separable flask (volume: 500 ml) equipped with a condenser and a stirrer, and uniformly dissolved under stirring. A solution prepared in advance by dissolving 5.40 g (0.10 mol) of sodium methoxide in 20 ml of ethanol was added dropwise to the flask under stirring, and then a solution obtained in advance by dissolving 4.19 g (0.10 ml) of tetraphenylphosphonium bromide in 100 ml of ethanol was gradually added dropwise to the flask, whereby a crystal was precipitated. The crystal thus precipitated was collected by filtration, washed with water and dried in vacuum, thereby obtaining a purified product.

The resulting compound was taken as compound C12. As a result of analysis of the compound C12 through $^1$H-NMR, mass spectrometry and elementary analysis, it was confirmed that the compound C12 is the intended phosphonium silicate represented by the following formula (23). The yield of the compound C12 was 96%.

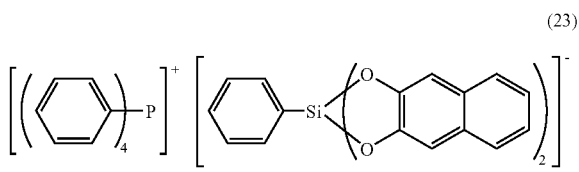
(23)

Production of Compound C13

8.26 g (0.040 mol) of hexyltrimethoxysilane, 8.81 g (0.080-mol) of catechol, a sodium hydroxide solution obtained in advance by dissolving 1.60 g (0.040 mol) of sodium hydroxide in 10 ml of methanol, and 50 ml of methanol were put into a separable flask (volume: 200 ml) equipped with a condenser and a stirrer and the mixture was stirred to yield a uniform solution. A solution obtained in advance by mixing 27.7 g (0.040 mol) of a 40 wt. % aqueous solution of tetrabutylphosphonium hydroxide with 25 ml of methanol was gradually added dropwise to the flask to precipitate a crystal. The crystal thus precipitated was collected by filtration, washed with water and vacuum dried, whereby 19.1 g of a pale yellow crystal was obtained.

The resulting compound was taken as compound C13. As a result of analysis of the compound C13 through $^1$H-NMR, mass spectrometry and elementary analysis, it was confirmed that the compound C13 is the intended phosphonium silicate represented by the following formula (24). The yield of the compound C13 was 82%.

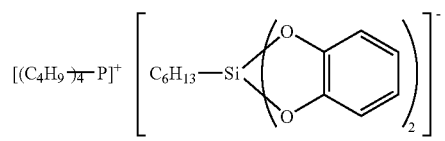
(24)

Preparation of Epoxy Resin Composition and Manufacture of Semiconductor Device

Epoxy resin compositions each containing any of the above-mentioned compounds C1 to C13 and triphenyl phosphine were prepared, and these were used in manufacturing semiconductor devices.

Example 1

Biphenyl-type epoxy resin (YX-4000HK manufacture by Japan Epoxy Resins Co., Ltd.) of the formula (16) shown below as the compound (A); phenolaralkyl resin (XLC-LL manufactured by Mitsui Chemicals Corp.) of the formula (17) shown below (in which the number of repetitive units of 3 is a mean value) as the compound (B); the compound C1 as the latent catalyst (C); fused spherical silica (having a mean particle size of 15 μm) as the inorganic filler (D); carbon black, bromobisphenol A-type epoxy resin and carnauba wax as the other additives were prepared.

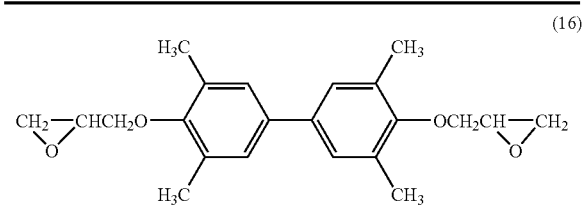
(16)

Physical Data of Compound of Formula (16)

| | |
|---|---|
| Melting point: | 105° C. |
| Epoxy equivalent: | 193 |
| ICI melt viscosity at 150° C.: | 0.15 poises |

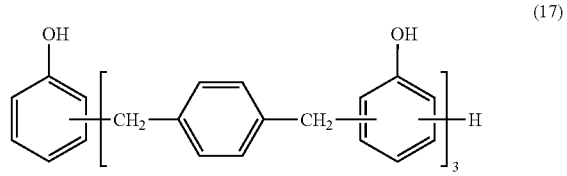
(17)

Physical Data of Compound of Formula (17)

| | |
|---|---|
| Softening point: | 77° C. |
| Hydroxyl equivalent: | 172 |
| ICI melt viscosity at 150° C.: | 3.6 poises |

Next, 52 parts by weight of the biphenyl-type epoxy resin, 48 parts by weight of the phenolaralkyl resin, 3.13 parts by weight of the compound C1, 730 parts by weight of fused spherical silica, 2 parts by weight of carbon black, 2 parts by weight of bromobisphenol A-type epoxy resin, and 2 parts by weight of carnauba wax were mixed at room temperature, then kneaded with a hot roll at 95° C. for 8 minutes, and cooled and ground to obtain an epoxy resin composition (thermosetting resin composition).

8 packages (semiconductor device) of 100-pin TQFP, and 15 packages (semiconductor device) of 16-pin DIP were manufactured, using the epoxy resin composition as a molding resin.

100-pin TQFP was manufactured in a mode of transfer molding at a mold temperature of 175° C. under an injection pressure of 7.4 MPa and for a curing time of 2 minutes, followed by post-curing at 175° C. for 8 hours.

The package size of the 100-pin TQFP was 14×14 mm, its thickness was 1.4 mm; the silicon chip (semiconductor chip) size was 8.0×8.0 mm; and the lead frame was formed of 42-alloy.

16-pin DIP was manufactured in a mode of transfer molding at a mold temperature of 175° C. under an injection pressure of 6.8 MPa and for a curing time of 2 minutes, followed by post-curing at 175° C. for 8 hours.

The package size of the 16-pin DIP was 6.4×19.8 mm, its thickness was 3.5 mm; the silicon chip (semiconductor chip) size was 3.5×3.5 mm; and the lead frame was formed of 42-alloy.

Example 2

Biphenylaralkyl-type epoxy resin (NC-3000P manufactured by Nippon Kayaku Co., Ltd.) of the formula (18) shown below (in which the number of repetitive units of 3 is a mean value) as the compound (A); biphenylaralkyl-type phenol resin (MEH-7851SS manufactured by Meiwa Kasei K.K.) of the formula (19) shown below (in which the number of repetitive units of 3 is a mean value) as the compound (B); the compound C1 as the latent catalyst (C); fused spherical silica (having a mean particle size of 15 μm) as the inorganic filler (D); carbon black, bromobisphenol A-type epoxy resin and carnauba wax as the other additives were prepared.

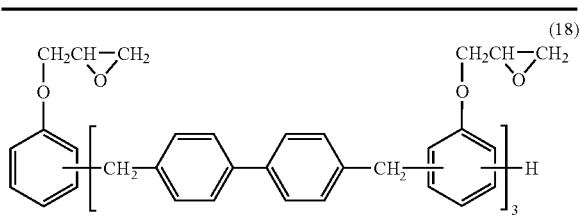

Physical Data of Compound of Formula (18)

| Melting point: | 60° C. |
| --- | --- |
| Epoxy equivalent: | 272 |
| ICI melt viscosity at 150° C.: | 1.3 poises |

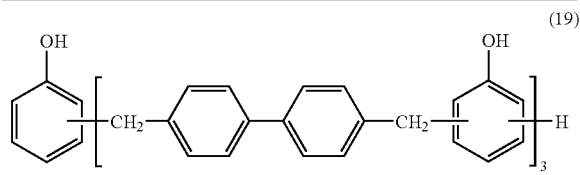

Physical Data of Compound of Formula (19)

| Softening point: | 68° C. |
| --- | --- |
| Hydroxyl equivalent: | 199 |
| ICI melt viscosity at 150° C.: | 0.9 poises |

Next, 57 parts by weight of the biphenylaralkyl-type epoxy resin, 43 parts by weight of the biphenylaralkyl-type phenol resin, 3.13 parts by weight of the compound C1, 650 parts by weight of fused spherical silica, 2 parts by weight of carbon black, 2 parts by weight of bromobisphenol A-type epoxy resin, and 2 parts by weight of carnauba wax were mixed at room temperature, then kneaded with a hot roll at 105° C. for 8 minutes, and cooled and ground to obtain an epoxy resin composition (thermosetting resin composition).

Using the epoxy resin composition, packages (semiconductor device) were manufactured in the same manner as in Example 1.

Example 3

An epoxy resin composition (thermosetting resin composition) was prepared in the same manner as in Example 1 except that 3.64 parts by weight of the compound C2 was used in place of the compound C1. Using the epoxy resin composition, packages (semiconductor device) were manufactured in the same manner as in Example 1.

Example 4

An epoxy resin composition (thermosetting resin composition) was prepared in the same manner as in Example 2 except that 3.64 parts by weight of the compound C2 was used in place of the compound C1. Using the epoxy resin composition, packages (semiconductor device) were manufactured in the same manner as in Example 2.

Example 5

An epoxy resin composition (thermosetting resin composition) was prepared in the same manner as in Example 1 except that 2.28 parts by weight of the compound C3 was used in place of the compound C1. Using the epoxy resin composition, packages (semiconductor device) were manufactured in the same manner as in Example 1.

Example 6

An epoxy resin composition (thermosetting resin composition) was prepared in the same manner as in Example 2 except that 2.28 parts by weight of the compound C3 was used in place of the compound C1. Using the epoxy resin composition, packages (semiconductor device) were manufactured in the same manner as in Example 2.

Example 7

An epoxy resin composition (thermosetting resin composition) was prepared in the same manner as in Example 1 except that 3.00 parts by weight of the compound C4 was used in place of the compound C1. Using the epoxy resin composition, packages (semiconductor device) were manufactured in the same manner as in Example 1.

Example 8

An epoxy resin composition (thermosetting resin composition) was prepared in the same manner as in Example 2 except that 3.00 parts by weight of the compound C4 was used in place of the compound C1. Using the epoxy resin composition, packages (semiconductor device) were manufactured in the same manner as in Example 2.

Example 9

An epoxy resin composition (thermosetting resin composition) was prepared in the same manner as in Example 1 except that 3.48 parts by weight of the compound C5 was used in place of the compound C1. Using the epoxy resin composition, packages (semiconductor device) were manufactured in the same manner as in Example 1.

Example 10

An epoxy resin composition (thermosetting resin composition) was prepared in the same manner as in Example 2 except that 3.48 parts by weight of the compound C5 was used in place of the compound C1. Using the epoxy resin composition, packages (semiconductor device) were manufactured in the same manner as in Example 2.

Example 11

An epoxy resin composition (thermosetting resin composition) was prepared in the same manner as in Example 1 except that 2.57 parts by weight of the compound C6 was used in place of the compound C1. Using the epoxy resin composition, packages (semiconductor device) were manufactured in the same manner as in Example 1.

Example 12

An epoxy resin composition (thermosetting resin composition) was prepared in the same manner as in Example 2 except that 2.57 parts by weight of the compound C6 was used in place of the compound C1. Using the epoxy resin composition, packages (semiconductor device) were manufactured in the same manner as in Example 2.

Example 13

An epoxy resin composition (thermosetting resin composition) was prepared in the same manner as in Example 1 except that 3.63 parts by weight of the compound C7 was used in place of the compound C1. Using the epoxy resin composition, packages (semiconductor device) were manufactured in the same manner as in Example 1.

Example 14

An epoxy resin composition (thermosetting resin composition) was prepared in the same manner as in Example 2 except that 3.63 parts by weight of the compound C7 was used in place of the compound C1. Using the epoxy resin composition, packages (semiconductor device) were manufactured in the same manner as in Example 2.

Example 15

An epoxy resin composition (thermosetting resin composition) was prepared in the same manner as in Example 1 except that 3.57 parts by weight of the compound C8 was used in place of the compound C1. Using the epoxy resin composition, packages (semiconductor device) were manufactured in the same manner as in Example 1.

Example 16

An epoxy resin composition (thermosetting resin compositions was prepared in the same manner as in Example 2 except that 3.57 parts by weight of the compound C8 was used in place of the compound C1. Using the epoxy resin composition, packages (semiconductor device) were manufactured in the same manner as in Example 2.

Example 17

An epoxy resin composition (thermosetting resin composition) was prepared in the same manner as in Example 1 except that 3.31 parts by weight of the compound C9 was used in place of the compound C1. Using the epoxy resin composition, packages (semiconductor device) were manufactured in the same manner as in Example 1.

Example 18

An epoxy resin composition (thermosetting resin composition) was prepared in the same manner as in Example 2 except that 3.31 parts by weight of the compound C9 was used in place of the compound C1. Using the epoxy resin composition, packages (semiconductor device) were manufactured in the same manner as in Example 2.

Example 19

An epoxy resin composition (thermosetting resin composition) was prepared in the same manner as in Example 1 except that 4.31 parts by weight of the compound C10 was used in place of the compound C1. Using the epoxy resin composition, packages (semiconductor device) were manufactured in the same manner as in Example 1.

Example 20

An epoxy resin composition (thermosetting resin composition) was prepared in the same manner as in Example 2 except that 4.31 parts by weight of the compound C10 was used in place of the compound C1. Using the epoxy resin composition, packages (semiconductor device) were manufactured in the same manner as in Example 2.

Example 21

An epoxy resin composition (thermosetting resin composition) was prepared in the same manner as in Example 1 except that 3.97 parts by weight of the compound C11 was used in place of the compound C1. Using the epoxy resin composition, packages (semiconductor device) were manufactured in the same manner as in Example 1.

Example 22

An epoxy resin composition (thermosetting resin composition) was prepared in the same manner as in Example 2 except that 3.97 parts by weight of the compound C11 was used in place of the compound C1. Using the epoxy resin composition, packages (semiconductor device) were manufactured in the same manner as in Example 2.

Example 23

An epoxy resin composition (thermosetting resin composition) was prepared in the same manner as in Example 1 except that 3.89 parts by weight of the compound C12 was used in place of the compound C1. Using the epoxy resin composition, packages (semiconductor device) were manufactured in the same manner as in Example 1.

Example 24

An epoxy resin composition (thermosetting resin composition) was prepared in the same manner as in Example 2 except that 3.89 parts by weight of the compound C12 was used in place of the compound C1. Using the epoxy resin composition, packages (semiconductor device) were manufactured in the same manner as in Example 2.

Example 25

An epoxy resin composition (thermosetting resin composition) was prepared in the same manner as in Example 1 except that 2.56 parts by weight of the compound C13 was used in place of the compound C1. Using the epoxy resin composition, packages (semiconductor device) were manufactured in the same manner as in Example 1.

Example 26

An epoxy resin composition (thermosetting resin composition) was prepared in the same manner as in Example 2 except that 2.56 parts by weight of the compound C13 was used in place of the compound C1. Using the epoxy resin composition, packages (semiconductor device) were manufactured in the same manner as in Example 2.

Comparative Example 1

An epoxy resin composition (thermosetting resin composition) was prepared in the same manner as in Example 1 except that 1.85 parts by weight of triphenyl phosphine-benzoquinone adduct was used in place of the compound C1. Using the epoxy resin composition, packages (semiconductor device) were manufactured in the same manner as in Example 1.

Comparative Example 2

An epoxy resin composition (thermosetting resin composition) was prepared in the same manner as in Example 2 except that 1.85 parts by weight of triphenyl phosphine-benzoquinone adduct was used in place of the compound C1. Using the epoxy resin composition, packages (semiconductor device) were manufactured in the same manner as in Example 2.

Comparative Example 3

An epoxy resin composition (thermosetting resin composition) was prepared in the same manner as in Example 1 except that 1.00 part by weight of triphenyl phosphine was used in place of the compound C1. Using the epoxy resin composition, packages (semiconductor device) were manufactured in the same manner as in Example 1.

Comparative Example 4

An epoxy resin composition (thermosetting resin composition) was prepared in the same manner as in Example 2 except that 1.00 part by weight of triphenyl phosphine was used in place of the compound C1. Using the epoxy resin composition, packages (semiconductor device) were manufactured in the same manner as in Example 2.

Comparative Example 5

An epoxy resin composition (thermosetting resin composition) was prepared in the same manner as in Example 1 except that 2.57 parts by weight of C14 of the formula (20) shown below was used in place of the compound C1. Using the epoxy resin composition, packages (semiconductor device) were manufactured in the same manner as in Example 1.

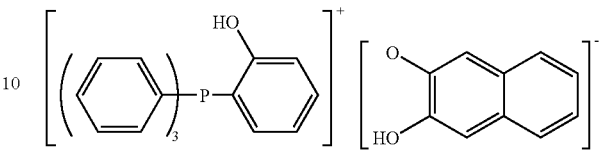

Comparative Example 6

An epoxy resin composition (thermosetting resin composition) was prepared in the same manner as in Example 2 except that 2.57 parts by weight of C14 was used in place of the compound C1. Using the epoxy resin composition, packages (semiconductor device) were manufactured in the same manner as in Example 2.

Comparative Example 7

An epoxy resin composition (thermosetting resin composition) was prepared in the same manner as in Example 1 except that 2.81 parts by weight of C15 of the formula (21) shown below was used in place of the compound C1. Using the epoxy resin composition, packages (semiconductor device) were manufactured in the same manner as in Example 1.

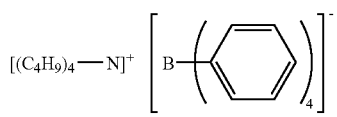

Comparative Example 8

An epoxy resin composition (thermosetting resin composition) was prepared in the same manner as in Example 2 except that 2.81 parts by weight of C15 was used in place of the compound C1. Using the epoxy resin composition, packages (semiconductor device) were manufactured in the same manner as in Example 2.

Comparative Example 9

An epoxy resin composition (thermosetting resin composition) was prepared in the same manner as in Example 1 except that 3.29 parts by weight of C16 of the formula (22) shown below was used in place of the compound C1. Using the epoxy resin composition, packages (semiconductor device) were manufactured in the same manner as in Example 1.

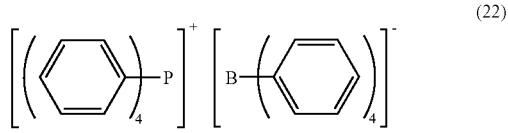

(22)

Comparative Example 10

An epoxy resin composition (thermosetting resin composition) was prepared in the same manner as in Example 2 except that 3.29 parts by weight of C16 was used in place of the compound C1. Using the epoxy resin composition, packages (semiconductor device) were manufactured in the same manner as in Example 2.

Evaluation of Properties

The properties of the epoxy resin compositions obtained in the Examples and the Comparative Examples were evaluated for items (1) to (3) mentioned below, and the properties of the semiconductor devices manufactured in the Examples and the Comparative Examples were evaluated for items (4) and (5) mentioned below.

(1) Spiral Flow:

Using a mold for spiral flow determination according to EMMI-I-66, each resin composition was examined at a mold temperature of 175° C. under an injection pressure of 6.8 MPa for a curing time of 2 minutes.

The spiral flow is a parameter of resin flowability. Larger values indicate better flowability.

(2) Curing Torque:

Using a curelastmeter (Orientec's JSR Curelastmeter IV PS Model), the torque of each resin composition was measured after 45 seconds at 175° C.

Larger values of the curing torque indicate better curability.

(3) Flow Retention:

The epoxy resin compositions were stored in air at 30° C. for 1 week, and their spiral flow was measured in the same manner as in the above item (1). The percentage (%) of the spiral flow of the stored sample relative to that of the fresh sample is obtained.

Larger values of the flow retention indicate better storability.

(4) Solder-Cracking Resistance:

100-pin TQFE was left in an atmosphere at 85° C. and 85% RH for 168 hours, and then dipped in a solder bath at 260° C. for 10 seconds.

Next, the samples were checked for external cracks. The crack formation was expressed by percentage in accordance with the formula: Crack Formation (%)=(number of cracked packages)/(number of all packages)×100.

In addition, the areal ratio of delamination of the silicon chip from the cured epoxy resin composition was determined by the use of a Scan Acoustic Tomograph. Delamination (%)=(delaminated area)/(silicon chip area)×100. The data of the tested 8 packages were averaged, and the mean value is expressed in terms of percentage (%).

Smaller values of the crack formation and the delamination indicate better solder-cracking resistance.

(5) Moisture-Resistant Reliability:

A voltage of 20 V was applied to 16-pin DIP in a water vapor at 125° C. and 100% RH, and the samples were checked for interconnection failure. The time required until 8 of 15 packages tested showed some interconnection failure was taken as the failure time.

The test time was at most 500 hours. When the number of failed packages was less than 8 at lapse of time of 500 hours, then the failure time of the sample is indicated as over 500 hours (>500).

Larger values of the failure time indicate better moisture-resistant reliability.

The test data of (1) to (5) are given in Table 1 and Table 2.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Composition (wt. pts) | Component (A) | YX-4000HK | 52 | | 52 | | 52 | | 52 | | 52 | | 52 | |
| | | NC-3000 | | 57 | | 57 | | 57 | | 57 | | 57 | | 57 |
| | Component (B) | XLC-LL | 48 | | 48 | | 48 | | 48 | | 48 | | 48 | |
| | | MEH-785155 | | 43 | | 43 | | 43 | | 43 | | 43 | | 43 |
| | Component (C) | C1 | 3.13 | 3.13 | | | | | | | | | | |
| | | C2 | | | 3.64 | 3.64 | | | | | | | | |
| | | C3 | | | | | 2.28 | 2.28 | | | | | | |
| | | C4 | | | | | | | 3.00 | 3.00 | | | | |
| | | C5 | | | | | | | | | 3.45 | 3.48 | | |
| | | C6 | | | | | | | | | | | 2.57 | 2.57 |
| | | C7 | | | | | | | | | | | | |
| | | C8 | | | | | | | | | | | | |
| | | C9 | | | | | | | | | | | | |
| | | C10 | | | | | | | | | | | | |
| | | C11 | | | | | | | | | | | | |
| | Component (D) | Fused spherical silica | 730 | 650 | 730 | 650 | 730 | 650 | 730 | 650 | 730 | 650 | 730 | 650 |
| | | Carbon black | 2 | 2 | 2 | 2 | 2 | 2 | 2 | 2 | 2 | 2 | 2 | 2 |
| | | Bromo-bisphenol A-type epoxy resin | 2 | 2 | 2 | 2 | 2 | 2 | 2 | 2 | 2 | 2 | 2 | 2 |
| | | Carnauba wax | 2 | 2 | 2 | 2 | 2 | 2 | 2 | 2 | 2 | 2 | 2 | 2 |
| Properties | | Spiral flow (cm) | 126 | 120 | 136 | 125 | 130 | 121 | 133 | 126 | 123 | 115 | 120 | 111 |
| | | Curing torque (N·m) | 7.79 | 7.91 | 7.05 | 7.13 | 7.24 | 7.35 | 7.25 | 7.25 | 7.66 | 7.86 | 7.33 | 7.50 |
| | | 90 Seconds torque saturation (%) | 90 | 91 | 89 | 90 | 88 | 90 | 89 | 91 | 93 | 94 | 92 | 91 |
| | | Flow retention (%) | 88 | 85 | 92 | 90 | 92 | 88 | 92 | 89 | 90 | 88 | 89 | 86 |

TABLE 1-continued

|  |  |  |  |  |  |  |  |  |  |  |  |  |
|---|---|---|---|---|---|---|---|---|---|---|---|---|
| Solder resistance (number of external cracks, %) | 0 | 0 | 0 | 0 | 0 | 0 | 0 | 0 | 0 | 0 | 0 | 0 |
| Solder resistance (delamination, %) | 0 | 0 | 0 | 0 | 0 | 0 | 0 | 0 | 0 | 0 | 0 | 0 |
| Moisture-resistant reliability | >500 | >500 | >500 | >500 | >500 | >500 | >500 | >500 | >500 | >500 | >500 | >500 |

|  |  |  | Example |  |  |  |  |  |  |
|---|---|---|---|---|---|---|---|---|---|
|  |  |  | 13 | 14 | 15 | 16 | 17 | 18 | 19 |
| Composition (wt. pts) | Component (A) | YX-4000HK | 52 |  | 52 |  | 52 |  | 52 |
|  |  | NC-3000 |  | 57 |  | 57 |  | 57 |  |
|  | Component (B) | XLC-LL | 48 |  | 48 |  | 48 |  | 48 |
|  |  | MEH-785155 |  | 43 |  | 43 |  | 43 |  |
|  | Component (C) | C1 |  |  |  |  |  |  |  |
|  |  | C2 |  |  |  |  |  |  |  |
|  |  | C3 |  |  |  |  |  |  |  |
|  |  | C4 |  |  |  |  |  |  |  |
|  |  | C5 |  |  |  |  |  |  |  |
|  |  | C6 |  |  |  |  |  |  |  |
|  |  | C7 | 3.63 | 3.63 |  |  |  |  |  |
|  |  | C8 |  |  | 3.57 | 3.57 |  |  |  |
|  |  | C9 |  |  |  |  | 3.31 | 3.31 |  |
|  |  | C10 |  |  |  |  |  |  | 4.31 |
|  |  | C11 |  |  |  |  |  |  |  |
|  |  | C12 |  |  |  |  |  |  |  |
|  |  | C13 |  |  |  |  |  |  |  |
|  | Component (D) | Fused spherical silica | 730 | 650 | 730 | 650 | 730 | 650 | 730 |
|  |  | Carbon black | 2 | 2 | 2 | 2 | 2 | 2 | 2 |
|  |  | Bromobisphenol A-type epoxy resin | 2 | 2 | 2 | 2 | 2 | 2 | 2 |
|  |  | Carnauba wax | 2 | 2 | 2 | 2 | 2 | 2 | 2 |
| Properties | Spiral flow (cm) |  | 124 | 114 | 131 | 121 | 122 | 113 | 117 |
|  | Curing torque (N·m) |  | 7.36 | 7.62 | 7.04 | 7.22 | 7.47 | 7.92 | 7.91 |
|  | 90 Seconds torque saturation (%) |  | 90 | 89 | 88 | 87 | 89 | 88 | 88 |
|  | Flow retention (%) |  | 92 | 89 | 92 | 88 | 88 | 85 | 89 |
|  | Solder resistance (number of external cracks, %) |  | 0 | 0 | 0 | 0 | 0 | 0 | 0 |
|  | Solder resistance (delamination, %) |  | 0 | 0 | 0 | 0 | 0 | 0 | 0 |
|  | Moisture-resistant reliability |  | >500 | >500 | >500 | >500 | >500 | >500 | >500 |

|  |  |  | Example |  |  |  |  |  |  |
|---|---|---|---|---|---|---|---|---|---|
|  |  |  | 20 | 21 | 22 | 23 | 24 | 25 | 26 |
| Composition (wt. pts) | Component (A) | YX-4000HK |  | 52 |  | 52 |  | 52 |  |
|  |  | NC-3000 | 57 |  | 57 |  | 57 |  | 57 |
|  | Component (B) | XLC-LL |  | 48 |  | 48 |  | 48 |  |
|  |  | MEH-785155 | 43 |  | 43 |  | 43 |  | 43 |
|  | Component (C) | C1 |  |  |  |  |  |  |  |
|  |  | C2 |  |  |  |  |  |  |  |
|  |  | C3 |  |  |  |  |  |  |  |
|  |  | C4 |  |  |  |  |  |  |  |
|  |  | C5 |  |  |  |  |  |  |  |
|  |  | C6 |  |  |  |  |  |  |  |
|  |  | C7 |  |  |  |  |  |  |  |
|  |  | C8 |  |  |  |  |  |  |  |
|  |  | C9 |  |  |  |  |  |  |  |
|  |  | C10 | 4.31 |  |  |  |  |  |  |
|  |  | C11 |  | 3.97 | 3.97 |  |  |  |  |
|  |  | C12 |  |  |  | 3.89 | 3.89 |  |  |
|  |  | C13 |  |  |  |  |  | 2.56 | 2.56 |
|  | Component (D) | Fused spherical silica | 650 | 730 | 650 | 570 | 490 | 730 | 650 |
|  |  | Carbon black | 2 | 2 | 2 | 2 | 2 | 2 | 2 |
|  |  | Bromobisphenol A-type epoxy resin | 2 | 2 | 2 | 2 | 2 | 2 | 2 |
|  |  | Carnauba wax | 2 | 2 | 2 | 2 | 2 | 2 | 2 |
| Properties | Spiral flow (cm) |  | 112 | 144 | 138 | 131 | 129 | 109 | 104 |
|  | Curing torque (N·m) |  | 7.92 | 6.68 | 6.89 | 7.58 | 7.93 | 7.24 | 7.12 |
|  | 90 Seconds torque saturation (%) |  | 87 | 86 | 84 | 92 | 93 | 93 | 91 |
|  | Flow retention (%) |  | 86 | 93 | 94 | 92 | 93 | 90 | 87 |
|  | Solder resistance (number of external cracks, %) |  | 0 | 0 | 0 | 0 | 0 | 0 | 0 |
|  | Solder resistance (delamination, %) |  | 0 | 0 | 0 | 0 | 0 | 0 | 0 |
|  | Moisture-resistant reliability |  | >500 | >500 | >500 | >500 | >500 | >500 | >500 |

TABLE 2

|  |  |  | Comparative Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Composition (wt. pts) | Component (A) | YX-4000HK | 52 |  | 52 |  | 52 |  | 52 |  | 52 |  |
|  |  | NC-3000 |  | 57 |  | 57 |  | 57 |  | 57 |  | 57 |
|  | Component (B) | XLC-LL | 48 |  | 48 |  | 48 |  | 48 |  | 48 |  |
|  |  | MEH-785155 |  | 43 |  | 43 |  | 43 |  | 43 |  | 43 |
|  | Component (C) | Triphenyl phosphine/p-benzoquinone adduct | 1.85 | 1.85 |  |  |  |  |  |  |  |  |
|  |  | Ttriphenyl phosphine |  |  | 1.00 | 1.00 |  |  |  |  |  |  |
|  |  | C14 |  |  |  |  | 2.52 | 2.52 |  |  |  |  |
|  |  | C15 |  |  |  |  |  |  | 2.81 | 2.81 |  |  |
|  |  | C16 |  |  |  |  |  |  |  |  | 3.29 | 3.29 |
|  | Component (D) | Fused spherical silica | 730 | 650 | 730 | 650 | 730 | 650 | 730 | 650 | 730 | 650 |
|  |  | Carbon black | 2 | 2 | 2 | 2 | 2 | 2 | 2 | 2 | 2 | 2 |
|  |  | Bromobisphenol A-type epoxy resin | 2 | 2 | 2 | 2 | 2 | 2 | 2 | 2 | 2 | 2 |
|  |  | Carnauba wax | 2 | 2 | 2 | 2 | 2 | 2 | 2 | 2 | 2 | 2 |
| Properties | Spiral flow (cm) |  | 105 | 99 | 77 | 65 | 84 | 81 | 146 | 140 | 144 | 139 |
|  | Curing torque (N·m) |  | 7.00 | 7.15 | 3.90 | 4.33 | 7.75 | 7.90 | 5.02 | 6.10 | 4.24 | 5.01 |
|  | 90 Seconds torque saturation (%) |  | 94 | 93 | 88 | 89 | 94 | 95 | 72 | 80 | 64 | 66 |
|  | Flow retention (%) |  | 86 | 83 | 78 | 76 | 86 | 84 | 86 | 87 | 90 | 89 |
|  | Solder resistance (number of external cracks, %) |  | 20 | 20 | 20 | 20 | 0 | 0 | 20 | 20 | 10 | 10 |
|  | Solder resistance (delamination, %) |  | 15 | 15 | 5 | 5 | 0 | 0 | 5 | 5 | 10 | 10 |
|  | Moisture-resistant reliability |  | 480 | 480 | >500 | >500 | >500 | >500 | >500 | >500 | 480 | 480 |

As shown in Table 1 and Table 2, the epoxy resin compositions of Examples 1 to 26 (that are the epoxy resin compositions of the invention) all had good curability and good flowability, and, in addition, the packages of the Examples encapsulated with the cured product of the resin composition (that are the semiconductor devices of the invention) all had good solder-cracking resistance and good moisture-resistant reliability.

Contrary, the epoxy resin compositions of Comparative Example 1 and Comparative Example 2 were both poor in flowability, and the packages of these Comparative Examples were not resistant to solder-cracking and their moisture-resistant reliability was extremely low. The epoxy resin compositions of Comparative Example 3 and Comparative Example 4 both had remarkably poor curability and flowability, and the packages of these Comparative Examples were not resistant to solder-cracking. The epoxy resin compositions of Comparative Example 5 and Comparative Example 6 were both poor in flowability. The epoxy resin compositions of Comparative Example 7, Comparative Example 8, Comparative Example 9 and Comparative Example 10 were all deteriorated in curability, and could not bring about good cracking resistance and reliability.

Examples 27 to 39, Comparative Example 11 to 15

Epoxy resin compositions (thermosetting resin compositions) were produced in the same manner as in Examples 1, 3, 5, 7, 9, 11, 13, 15, 17, 19, 21, 23, 25 and Comparative Examples 1, 3, 5, 7, 9, respectively, except that 26 parts by weight of the biphenyl-type epoxy resin of formula (16) and 28.5 parts by weight of the biphenylaralkyl-type epoxy resin of formula (18) were used as the compound (A), and 45.5 parts by weight of the phenolaralkyl resin of formula (17) was used as the compound (B). Using the epoxy resin compositions, packages (semiconductor device) were manufactured.

The epoxy resin compositions and the packages of these Examples 27 to 39 and Comparative Examples 11 to 15 were tested and evaluated in the same manner as above, and they gave almost the same results as the corresponding data in Table 1 of the respective base Example.

Examples 40 to 52, Comparative Examples 16 to 20

Epoxy resin compositions (thermosetting resin compositions) were produced in the same manner as in Examples 1, 3, 5, 7, 9, 11, 13, 15, 17, 19, 21, 23, 25, and Comparative Examples 1, 3, 5, 7, 9, respectively, except that 54.5 parts by weight of the biphenyl-type epoxy resin of formula (16) was used as the compound (A), and 24 parts by weight of the phenolaralkyl resin of formula (17) and 21.5 parts by weight of the biphenylaralkyl-type phenol resin of formula (19) were used as the compound (B). Using the epoxy resin compositions, packages (semiconductor device) were manufactured.

The epoxy resin compositions and the packages of these Examples 40 to 52 and Comparative Examples 16 to 20 were tested and evaluated in the same manner as above, and they gave almost the same results as the corresponding data in Table 1 of the respective base Example.

Using the latent catalyst of the invention, epoxy V resin compositions having good curability, flowability and storability can be obtained. Similarly to epoxy resins, the latent catalyst is suitable for thermosetting resin compositions that contains a phosphine or phosphonium salt as a curing accelerator. The resin composition of the invention is suitable for the field of electric and electronic materials.

While the present invention has been described in detail and with reference to specific embodiments thereof, it will be apparent to one skilled in the art that various changes and modifications can be made therein without departing from the spirit and scope thereof.

The present application is based on Japanese patent application Nos. 2003-307700 (filed Aug. 29, 2003) and 2004-081581 (filed Mar. 19, 2004), the contents thereof being herein incorporated by reference.

What is claimed is:

1. An epoxy resin composition comprising:
(A) a compound having at least two epoxy groups in one molecule;
(B) a compound having at least two phenolic hydroxyl groups in one molecule; and
(C) a latent catalyst represented by the following formula (1):

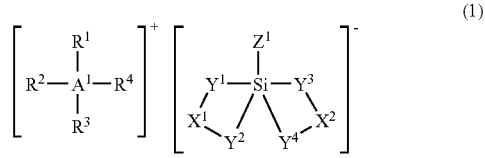

(1)

wherein $A^1$ represents a phosphorous atom;

$R^1$, $R^2$, $R^3$ and $R^4$ each represent an organic group having a substituted or unsubstituted, aromatic or heterocyclic ring or represent a substituted or unsubstituted aliphatic group, and $R^1$, $R^2$, $R^3$ and $R^4$ may be the same or different from one another;

$X^1$ represents an organic group that bonds to $Y^1$ and $Y^2$;

$X^2$ represents an organic group that bonds to $Y^3$ and $Y^4$;

$Y^1$ and $Y^2$ each represent a group resulting from a proton-donating substituent through release of a proton, and $Y^1$ and $Y^2$ bond to the silicon atom to form a chelate structure;

$Y^3$ and $Y^4$ each represent a group resulting from a proton-donating substituent through release of a proton, and $Y^3$ and $Y^4$ bond to the silicon atom to form a chelate structure;

$X^1$ and $X^2$ may be the same or different from each other;

$Y^1$, $Y^2$, $Y^3$ and $Y^4$ may be the same or different from one another; and $Z^1$ represents an organic group having a substituted or unsubstituted, aromatic or heterocyclic ring or represents a substituted or unsubstituted aliphatic group.

2. The epoxy resin composition according to claim 1, which further comprises (D) an inorganic filler.

3. The epoxy resin composition according to claim 2, wherein the inorganic filler (D) is present in an amount of from 200 to 2400 parts by weight per 100 parts by weight of the sum of the compound (A) and the compound (B).

4. A semiconductor device that comprises electronic parts encapsulated by a cured product of the epoxy resin composition of claim 3.

5. The epoxy resin composition according to claim 1, wherein the latent catalyst is prepared by a process comprising:
contacting a phosphonium halide with an alkali metal salt of a silicate.

* * * * *